United States Patent
DeFelice et al.

(10) Patent No.: US 10,824,172 B1
(45) Date of Patent: Nov. 3, 2020

(54) PNEUMATIC CONTROLLERS, PNEUMATICALLY CONTROLLED INLINE VALVES, AND METHODS OF ACTUATING INLINE VALVES

(71) Applicant: Hamilton Sundstrand Corporation, Charlotte, NC (US)

(72) Inventors: Robert DeFelice, South Windsor, CT (US); Peter J. Dowd, Granby, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/447,787

(22) Filed: Jun. 20, 2019

(51) Int. Cl.
| | |
|---|---|
| G05D 7/01 | (2006.01) |
| F04D 27/02 | (2006.01) |
| F02C 6/08 | (2006.01) |

(52) U.S. Cl.
CPC .............. *G05D 7/0146* (2013.01); *F02C 6/08* (2013.01); *F04D 27/0215* (2013.01); *Y10T 137/3367* (2015.04); *Y10T 137/3421* (2015.04); *Y10T 137/3476* (2015.04)

(58) Field of Classification Search
CPC ......... Y10T 137/3367; Y10T 137/3421; Y10T 137/3476; F04D 27/0215; F02C 6/08; F02C 9/18; F16K 31/50; F16K 1/126; F16K 31/1223; F16K 31/1226; G05D 7/0133; G05D 7/0146
See application file for complete search history.

(56) References Cited

U.S. PATENT DOCUMENTS

| | | | | |
|---|---|---|---|---|
| 1,362,331 | A * | 12/1920 | Larner | F16K 1/126 |
| | | | | 137/219 |
| 1,387,446 | A * | 8/1921 | Astier | F16K 1/12 |
| | | | | 137/219 |
| 1,441,784 | A * | 1/1923 | Clayton | F16K 1/12 |
| | | | | 137/330 |
| 1,448,717 | A * | 3/1923 | Slattery | F16K 1/126 |
| | | | | 137/219 |

(Continued)

FOREIGN PATENT DOCUMENTS

| | | |
|---|---|---|
| CN | 205534367 U | 8/2016 |
| EP | 0376115 A1 | 7/1990 |
| EP | 3056739 A1 | 8/2016 |

OTHER PUBLICATIONS

European Search Report for Application No. 19213503.6, dated Jul. 13, 2020, 9 pages.

*Primary Examiner* — Marina A Tietjen
*Assistant Examiner* — Frederick D Soski
(74) *Attorney, Agent, or Firm* — Cantor Colburn LLP (57) ABSTRACT

A pneumatic controller for an inline valve includes a manifold with a set screw seated within it, a selector, and a biasing member. The manifold has a low pressure port, a high pressure port, and an actuator port. The selector is movable within the manifold between a first position and a second position, the low pressure port in fluid communication with the actuator port in the first position, the high pressure port in fluid communication with the actuator port in the second position. The biasing member urges the selector towards the first position with a biasing force and is spaced apart from the selector to limit eccentric force exerted on the selector. Inline valves and methods of controlling fluid flow through inline valves are also described.

17 Claims, 4 Drawing Sheets

(56) References Cited

U.S. PATENT DOCUMENTS

| | | | | |
|---|---|---|---|---|
| 1,723,736 A * | 8/1929 | Kruse | F16K 1/126 | 137/220 |
| 1,777,060 A * | 9/1930 | Welcker | F16K 1/126 | 137/220 |
| 1,824,916 A * | 9/1931 | Moody | F16K 1/126 | 137/219 |
| 1,829,703 A * | 10/1931 | Larner | F16K 1/126 | 137/219 |
| 1,838,723 A * | 12/1931 | Welcker | F16K 1/12 | 137/220 |
| 1,841,608 A * | 1/1932 | Kruse | F16K 17/32 | 137/220 |
| 1,842,146 A * | 1/1932 | Brotherton | F16K 1/12 | 137/219 |
| 1,856,222 A * | 5/1932 | McClellan | F16K 1/126 | 137/220 |
| 1,941,357 A * | 12/1933 | Kruse | F16K 1/126 | 137/220 |
| 2,085,893 A * | 7/1937 | Boland | F16K 1/126 | 137/219 |
| 2,095,410 A * | 10/1937 | Diescher | F16K 1/12 | 137/220 |
| 2,133,983 A * | 10/1938 | Gaston | F16K 1/12 | 137/219 |
| 2,269,671 A * | 1/1942 | Kinzie | F03C 2/08 | 137/219 |
| 2,442,625 A * | 6/1948 | Thomas | F16K 1/12 | 137/219 |
| 2,608,204 A * | 8/1952 | Dunn | F16K 7/075 | 137/220 |
| 2,914,079 A * | 11/1959 | Hertrich | B04B 9/06 | 137/219 |
| 2,919,714 A * | 1/1960 | Mrazek | F16K 1/126 | 137/220 |
| 2,931,378 A * | 4/1960 | Davies | F16K 24/04 | 137/220 |
| 2,938,533 A * | 5/1960 | Jensen | F16K 1/126 | 137/219 |
| 2,943,636 A * | 7/1960 | Reed | E03B 9/04 | 137/220 |
| 2,950,732 A * | 8/1960 | Lambert | G05D 16/106 | 137/219 |
| 2,996,074 A * | 8/1961 | Page | F16K 31/363 | 137/220 |
| 3,003,516 A * | 10/1961 | Granberg | G01F 15/005 | 137/220 |
| 3,074,685 A * | 1/1963 | Eckert | F16K 47/00 | 251/77 |
| 3,076,471 A * | 2/1963 | Salerno | G05D 7/014 | 137/219 |
| 3,092,132 A * | 6/1963 | Guy | F16K 1/12 | 137/219 |
| 3,092,133 A * | 6/1963 | Clark | F16K 1/126 | 137/220 |
| 3,119,405 A * | 1/1964 | Guy | F16K 1/126 | 137/219 |
| 3,134,394 A * | 5/1964 | Tsunetaro | F16K 15/06 | 137/220 |
| 3,155,108 A * | 11/1964 | Kahn | B64D 13/02 | 137/220 |
| 3,156,253 A * | 11/1964 | Marderness | F16K 1/126 | 137/220 |
| 3,172,420 A * | 3/1965 | Brown | F16K 1/126 | 137/219 |
| 3,177,889 A * | 4/1965 | Hardison | F16K 31/34 | 137/220 |
| 3,192,940 A * | 7/1965 | Wiersholm | G05D 7/03 | 137/220 |
| 3,194,255 A * | 7/1965 | Flaton | F16K 15/06 | 137/220 |
| 3,297,047 A * | 1/1967 | Sime | F16K 1/126 | 137/220 |
| 3,338,259 A * | 8/1967 | Tribe | F16K 1/126 | 137/220 |
| 3,359,998 A * | 12/1967 | Fike | F16K 1/126 | 137/220 |
| 3,380,469 A * | 4/1968 | Salerno | F16K 31/42 | 137/219 |
| 3,399,689 A * | 9/1968 | Keane | F16K 1/126 | 137/220 |
| 3,489,165 A * | 1/1970 | Salerno | G05D 16/166 | 137/220 |
| 3,490,484 A * | 1/1970 | Runton | F16K 1/126 | 137/219 |
| 3,534,769 A * | 10/1970 | Leveque | F16K 31/36 | 137/501 |
| 3,566,907 A * | 3/1971 | Sime | F16K 1/126 | 137/219 |
| 3,583,440 A * | 6/1971 | Andersson | F16K 31/1223 | 137/624.14 |
| 3,586,033 A * | 6/1971 | Hieber | B64D 39/06 | 137/220 |
| 3,589,386 A | 6/1971 | Chapman et al. | | |
| 3,617,151 A * | 11/1971 | Scroggins | F16K 1/126 | 417/18 |
| 3,643,685 A * | 2/1972 | Hays | F16K 1/126 | 137/501 |
| 3,643,707 A * | 2/1972 | Ensign | B67D 7/28 | 141/286 |
| 3,792,713 A * | 2/1974 | Zadoo | F16K 1/126 | 137/486 |
| 3,792,716 A * | 2/1974 | Sime | F16K 1/126 | 137/492 |
| 3,825,026 A * | 7/1974 | Salerno | F01D 17/145 | 137/219 |
| 3,865,128 A * | 2/1975 | Zadoo | F16K 1/126 | 137/220 |
| 3,901,266 A * | 8/1975 | Guy | G05D 7/0153 | 137/219 |
| 3,945,393 A * | 3/1976 | Teatini | F16K 1/126 | 137/220 |
| 3,963,044 A * | 6/1976 | Brown | F16K 31/363 | 137/490 |
| 3,987,812 A * | 10/1976 | Nelson | F16K 1/12 | 137/219 |
| 3,993,093 A * | 11/1976 | Mokveld | F16J 15/062 | 137/484.6 |
| 4,052,035 A * | 10/1977 | Kenny | B05B 1/302 | 251/14 |
| 4,077,425 A * | 3/1978 | Drori | F16K 31/363 | 137/220 |
| 4,094,334 A * | 6/1978 | Taylor | E21B 34/10 | 137/219 |
| 4,221,234 A * | 9/1980 | Kruschik | F16L 55/10 | 137/219 |
| 4,226,259 A * | 10/1980 | Szekely | F16K 31/365 | 137/269 |
| 4,285,495 A * | 8/1981 | King | F16K 1/126 | 137/219 |
| 4,373,544 A * | 2/1983 | Goodman | F04D 27/0215 | 137/220 |
| 4,429,709 A * | 2/1984 | Niskanen | G05D 7/03 | 137/220 |
| 4,479,507 A * | 10/1984 | Nichols | B67D 7/301 | 137/219 |
| 4,565,210 A * | 1/1986 | Heine | F16K 1/12 | 137/219 |
| 4,577,654 A * | 3/1986 | Pringle | F16K 1/126 | 137/219 |
| 4,610,265 A * | 9/1986 | Nelson | F16K 1/126 | 137/219 |
| 4,693,268 A * | 9/1987 | Fahl | F16K 1/12 | 137/219 |
| 4,732,189 A * | 3/1988 | Jones | F16K 31/1223 | 137/220 |
| 4,911,196 A * | 3/1990 | Kemp | F16K 15/026 | 137/220 |

(56) References Cited

U.S. PATENT DOCUMENTS

| | | | | |
|---|---|---|---|---|
| 5,005,602 A * | 4/1991 | Fahl | ............ | F16K 1/12 137/219 |
| 5,249,599 A * | 10/1993 | Haynes | ............ | G05D 7/0133 137/501 |
| 5,441,171 A * | 8/1995 | Maury | ............ | B65D 88/703 222/3 |
| 5,540,252 A * | 7/1996 | Bruun | ............ | G05D 7/0146 137/220 |
| 5,603,352 A * | 2/1997 | Tavor | ............ | F16K 1/126 137/594 |
| 5,803,356 A * | 9/1998 | Babinger | ............ | F01P 11/16 137/219 |
| 5,826,613 A * | 10/1998 | Schalk | ............ | F16K 1/123 137/219 |
| 5,921,276 A * | 7/1999 | Lam | ............ | F16K 15/026 137/220 |
| 6,029,691 A * | 2/2000 | Tavor | ............ | F16K 1/12 137/219 |
| 6,216,721 B1 * | 4/2001 | Perez | ............ | F16K 1/126 137/219 |
| 6,230,734 B1 * | 5/2001 | Grebnev | ............ | F16K 1/123 137/220 |
| 6,446,657 B1 * | 9/2002 | Dziorny | ............ | F01D 17/105 137/219 |
| 8,656,941 B1 * | 2/2014 | Hayward | ............ | F02K 9/58 137/221 |
| 9,033,306 B2 * | 5/2015 | Kunau | ............ | B60C 25/145 141/38 |
| 9,080,832 B2 * | 7/2015 | Brahler, II | ............ | F41H 13/0006 |
| 10,253,901 B1 * | 4/2019 | Champaigne | ............ | F16K 27/048 |
| 2002/0005217 A1 * | 1/2002 | Lyons | ............ | G05D 7/014 137/220 |
| 2006/0054848 A1 * | 3/2006 | Vogt | ............ | F02B 37/16 251/77 |
| 2007/0284002 A1 * | 12/2007 | Hartman | ............ | F16K 3/265 137/219 |
| 2008/0224076 A1 * | 9/2008 | Jennings | ............ | F16K 7/20 251/122 |
| 2009/0250123 A1 * | 10/2009 | Matsubara | ............ | F16K 27/0209 137/528 |
| 2009/0272929 A1 * | 11/2009 | Bey | ............ | F16K 1/126 251/324 |
| 2010/0102259 A1 * | 4/2010 | Forster | ............ | F16K 31/0651 251/129.01 |
| 2010/0187462 A1 * | 7/2010 | Davies, Jr. | ............ | F16K 1/12 251/318 |
| 2012/0061595 A1 * | 3/2012 | Canjuga | ............ | F16K 1/126 251/62 |
| 2012/0090715 A1 * | 4/2012 | Fenwick | ............ | F16K 31/50 137/801 |
| 2014/0109983 A1 | 4/2014 | Rickis et al. | | |
| 2014/0124059 A1 * | 5/2014 | McAuliffe | ............ | F16K 31/12 137/492 |
| 2015/0008348 A1 * | 1/2015 | Greene | ............ | F16K 31/383 251/62 |
| 2016/0376913 A1 * | 12/2016 | Marocchini | ............ | F04D 27/0223 137/511 |
| 2017/0342853 A1 * | 11/2017 | Schwalm | ............ | F02C 6/08 |
| 2017/0363003 A1 * | 12/2017 | Evetts | ............ | F02C 7/18 |
| 2017/0370488 A1 * | 12/2017 | Reinholdt | ............ | G05D 16/103 |
| 2018/0073648 A1 * | 3/2018 | Wong | ............ | F16K 1/126 |
| 2020/0041005 A1 * | 2/2020 | Baumann | ............ | F16K 1/38 |
| 2020/0095944 A1 * | 3/2020 | Goodman | ............ | F16K 31/1223 |

* cited by examiner

PNEUMATIC CONTROLLERS, PNEUMATICALLY CONTROLLED INLINE VALVES, AND METHODS OF ACTUATING INLINE VALVES

STATEMENT OF FEDERAL SUPPORT

This invention was made with Government support under Contract No. FA8626-16-C-2139 awarded by the United States Air Force. The Government has certain rights in the invention.

BACKGROUND

The present disclosure generally relates to fluid systems, and more particularly to controlling fluid flow in fluid systems with inline valves.

Valves, such as pneumatically actuated valves, are commonly used to control the fluid flow in fluid systems. In some valves pneumatic actuation is controlled by ball-spring switch operative to communicate high or low pressure air to an actuator according to air pressure at the valve inlet. Typically, when air pressure at the valve inlet low the ball-spring switch provides low pressure air to the actuator, which allows the low pressure air at the valve inlet to open the valve. When air pressure at the valve inlet rises to a predetermined trigger pressure the ball-spring switch provides high pressure air to the actuator, which causes the actuator to close the valve. Leakage paths can sometimes through the ball-spring switch due to off-axis loadings, such as when eccentric loads communicated to the ball by the spring influence seating of the ball within pneumatic switch.

Such systems and methods valves have generally been acceptable for their intended purpose. However, there remains a need in the art for improved pneumatic controllers, inline valves, and methods of actuating inline valves. The present disclosure provides a solution to this need.

BRIEF DESCRIPTION

According to one embodiment, a pneumatic controller for an inline valve is provided. The pneumatic controller includes a manifold with a set screw seated therein and having a low pressure port, a high pressure port, and an actuator port; a selector movable within the manifold between a first position and a second position, the low pressure port in fluid communication with the actuator port in the first position, the high pressure port in fluid communication with the actuator port in the second position; and a biasing member urging the selector towards the first position with a biasing force, wherein the biasing member is spaced apart from the selector within the manifold to limit eccentric force exerted on the selector.

In addition to one or more of the features described above, or as an alternative, further embodiments may include that the selector has a spherical shape.

In addition to one or more of the features described above, or as an alternative, further embodiments may include that the selector includes a ceramic material.

In addition to one or more of the features described above, or as an alternative, further embodiments may include that the manifold includes a first selector seat fixed between the high pressure port and the actuator port; and a second selector seat fixed between the first selector seat and the vent, wherein the selector is disposed between the first selector seat and the second selector seat.

In addition to one or more of the features described above, or as an alternative, further embodiments may include a plunger supported within the manifold and arranged between the biasing member and the selector.

In addition to one or more of the features described above, or as an alternative, further embodiments may include that the plunger comprises push rod portion with a selector face, the selector face tangent to the selector.

In addition to one or more of the features described above, or as an alternative, further embodiments may include that the plunger has a flange portion extending thereabout on an end of the plunger opposite the selector, the biasing member fixed to the flange portion of the plunger.

In addition to one or more of the features described above, or as an alternative, further embodiments may include that the manifold has a plunger guide fixed between the high pressure port and the selector, the plunger slidably disposed in the plunger guide, the selector abutting the plunger guide in the second position.

In addition to one or more of the features described above, or as an alternative, further embodiments may include that the manifold includes a first selector seat fixed between the high pressure port and the actuator port, and a second selector seat fixed between the first selector seat and the vent. The selector is disposed between the first selector seat and the second selector seat and the plunger is slidably disposed within the second selector seat.

In addition to one or more of the features described above, or as an alternative, further embodiments may include a biasing member seat supported within the manifold between the set screw and the biasing member.

In addition to one or more of the features described above, or as an alternative, further embodiments may include that the biasing member seat has a set screw socket, wherein the set screw is rotatably received within the set screw socket.

In addition to one or more of the features described above, or as an alternative, further embodiments may include that the biasing member seat has a flange portion extending thereabout, the biasing member fixed to the flange portion of the biasing member seat.

In addition to one or more of the features described above, or as an alternative, further embodiments may include a pneumatic conduit fixed to the actuator port, and a valve body having an exterior and an actuator chamber, the actuator chamber connected to the pneumatic conduit, wherein the manifold is fixed to the exterior of the valve body to provide low pressure fluid or high pressure fluid to the actuator chamber according to position of the selector.

In addition to one or more of the features described above, or as an alternative, further embodiments may include that the manifold has a mount portion, and further comprising a valve body with an exterior, the mount portion connecting the manifold to the valve body.

In addition to one or more of the features described above, or as an alternative, further embodiments may include that the manifold has a mount portion, wherein the vent and the mount portion are on a common side of the manifold.

According to another embodiment an inline valve is provided. The inline valve includes a pneumatic controller as described above, the manifold having a mount portion. The inline valve additionally includes a valve body with an exterior, an inlet, and an outlet, the mount portion of the manifold connecting the manifold to the exterior of the valve body; and a poppet supported within the valve body and operably associated with the selector, wherein the poppet is movable between an actuator poppet seat and valve body poppet seat within the valve body, the inlet of the valve body in fluid communication with the outlet of the valve body when the poppet is against the actuator poppet seat, the poppet fluidly separating the inlet from the outlet when the poppet is against the valve body poppet seat.

In addition to one or more of the features described above, or as an alternative, further embodiments may include that the selector has a spherical shape, and wherein the selector comprises a ceramic material.

In addition to one or more of the features described above, or as an alternative, further embodiments may include that the pneumatic controller has a first selector seat arranged between the high pressure port and the actuator port; a second selector seat arranged between the first selector seat and the vent, wherein the selector is arranged between the first selector seat and the second selector seat; a plunger supported within the manifold, the plunger coupling the biasing member to the selector; and a biasing member seat supported within the manifold, the biasing member seat arranged between the biasing member and the low pressure port.

According to a further embodiment, a gas turbine engine is provided. The gas turbine engine includes a compressor having a bleed port, a high pressure stage downstream of the bleed port, and a low pressure stage upstream of the bleed port; a pneumatic controller as described above, the high pressure stage connected to the high pressure port; and an inline valve with a valve body with an inlet and an outlet, wherein the inlet is in fluid communication with the bleed port of the compressor, wherein the pneumatic controller is mounted to an exterior of the valve body.

In addition to one or more of the features described above, or as an alternative, further embodiments may include that the compressor has a low pressure stage upstream of the bleed port, and wherein the low pressure stage is connected to the low pressure port, or wherein the low pressure port is in fluid communication with the external environment to communicate ambient pressure therethrough.

Technical effects of the present disclosure include mechanical separation of the selector from the biasing member while retaining biasing force communication between the selector and the biasing member. In certain embodiments biasing member seat and a plunger member determine orientation of the biasing member, limiting (or eliminating entirely) eccentric load components on the selector and allowing the selector to seat within the manifold with limited or substantially no eccentric force component. This can limit leakage through the pneumatic controller, improving efficiency of the pneumatic controller and inline valves incorporating the controller.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
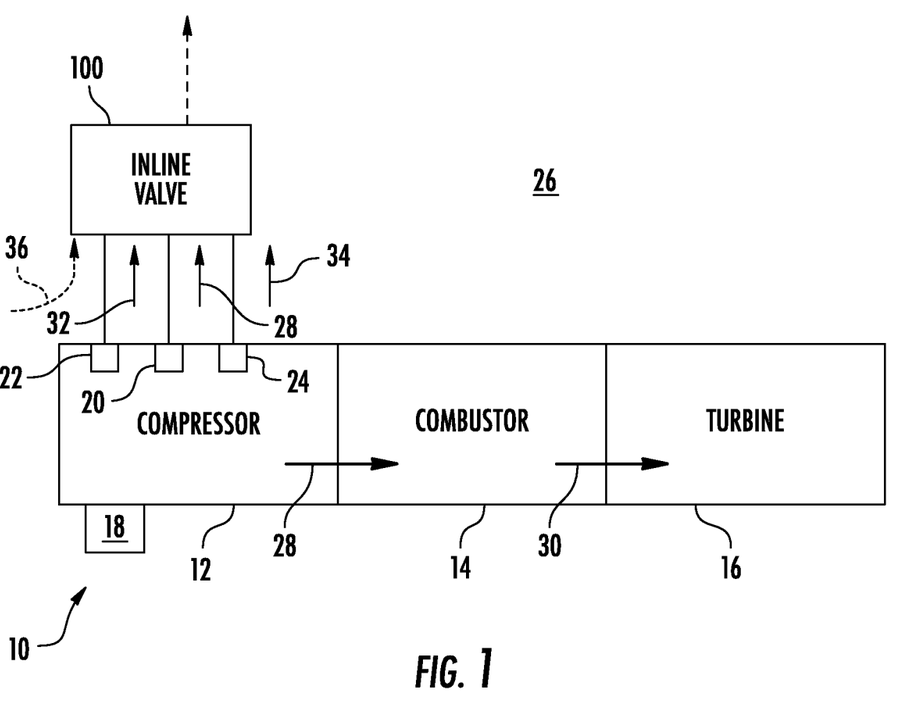
FIG. 1 is a schematic view of an inline valve constructed in accordance with the present disclosure, showing gas turbine engine compressor having a bleed port with the inline valve connected to the bleed port.

Reference will now be made to the drawings wherein like reference numerals identify similar structural features or aspects of the subject disclosure. For purposes of explanation and illustration, and not limitation, a partial view of an exemplary embodiment of a controller for an inline valve in accordance with the disclosure is shown in FIG. 1 and is designated generally by reference character 100. Other embodiments of controllers, inline valves, gas turbine engines and methods of controlling flow through inline valves in accordance with the present disclosure, or aspects thereof, are provided in FIGS. 2-6, as will be described. The systems and methods described herein can be used for pneumatically controlling passively actuated inline valves, such as bleed valves in gas turbine engines, though the present disclosure is not limited to controlling bleed flows in gas turbine engines or to gas turbine engines in general.

Referring to FIG. 1, a gas turbine engine 10 is shown. The gas turbine engine 10 includes a compressor 12, a combustor 14, and a turbine 16. The gas turbine engine 10 also includes a starter 18 and the inline valve 100.

The compressor 12 has a bleed port 20, a low pressure stage 22, and a high pressure stage 24. The low pressure stage 22 is arranged upstream (relative to a direction of fluid flow through the compressor 12) of the bleed port 20, the high pressure stage 24 is arranged downstream of the of the bleed port 20, and the compressor 12 is arranged to ingest and compress fluid from the external environment 26 to generate a working fluid flow 28, e.g., a compressed air flow. The combustor 14 is in fluid communication with the compressor 12 to receive the working fluid flow 28, and is arranged to generate therefrom a flow of high pressure combustion products 30. The turbine 16 is in fluid communication with the combustor 14 to extract energy from the flow of high pressure combustion products 30 to power the compressor 12.

The starter 18 is operably connected to the gas turbine engine 10 for starting the gas turbine engine 10. More specifically, the starter 18 is arranged to provide mechanical rotation to the compressor 12 during startup of the gas turbine engine 10 when power is unavailable from the turbine 16. To limit the power required during startup the inline valve 100 is connected to the bleed port 20. In this respect the inline valve 100 is arranged to provide fluid communication between the compressor 12 and the external environment 26 for passive actuation according to pressure within the compressor 12, as will be described.

In the illustrated embodiment the inline valve 100 is connected to the bleed port 20, the low pressure stage 22, and the high pressure stage 24. The low pressure stage 22 provides a flow of low pressure fluid 32, e.g., low pressure compressed air, to the inline valve 100. The high pressure stage 24 provides a flow of high pressure fluid 34, e.g., high pressure compressed air, to the inline valve 100. The bleed port 20 is in fluid communication with the inline valve 100 for selective fluid communication of a portion of the working fluid flow 28 with the external environment 26 according to operation of the bleed valve 100. It is contemplated that that the low pressure fluid 32 be relatively cool in comparison to the high pressure fluid 34. It is also contemplated that the flow of high pressure fluid 34 be of relatively high pressure and temperature in comparison to the flow of low pressure fluid 32, as will also be described. It is understood that this is for illustration purposes only and is non-limiting, and that other arrangements are possible and remain within the scope of the present disclosure. For example, in certain embodiments low pressure fluid may be obtained directly from the external environment, as shown with ambient fluid flow 36.

Figure 2:
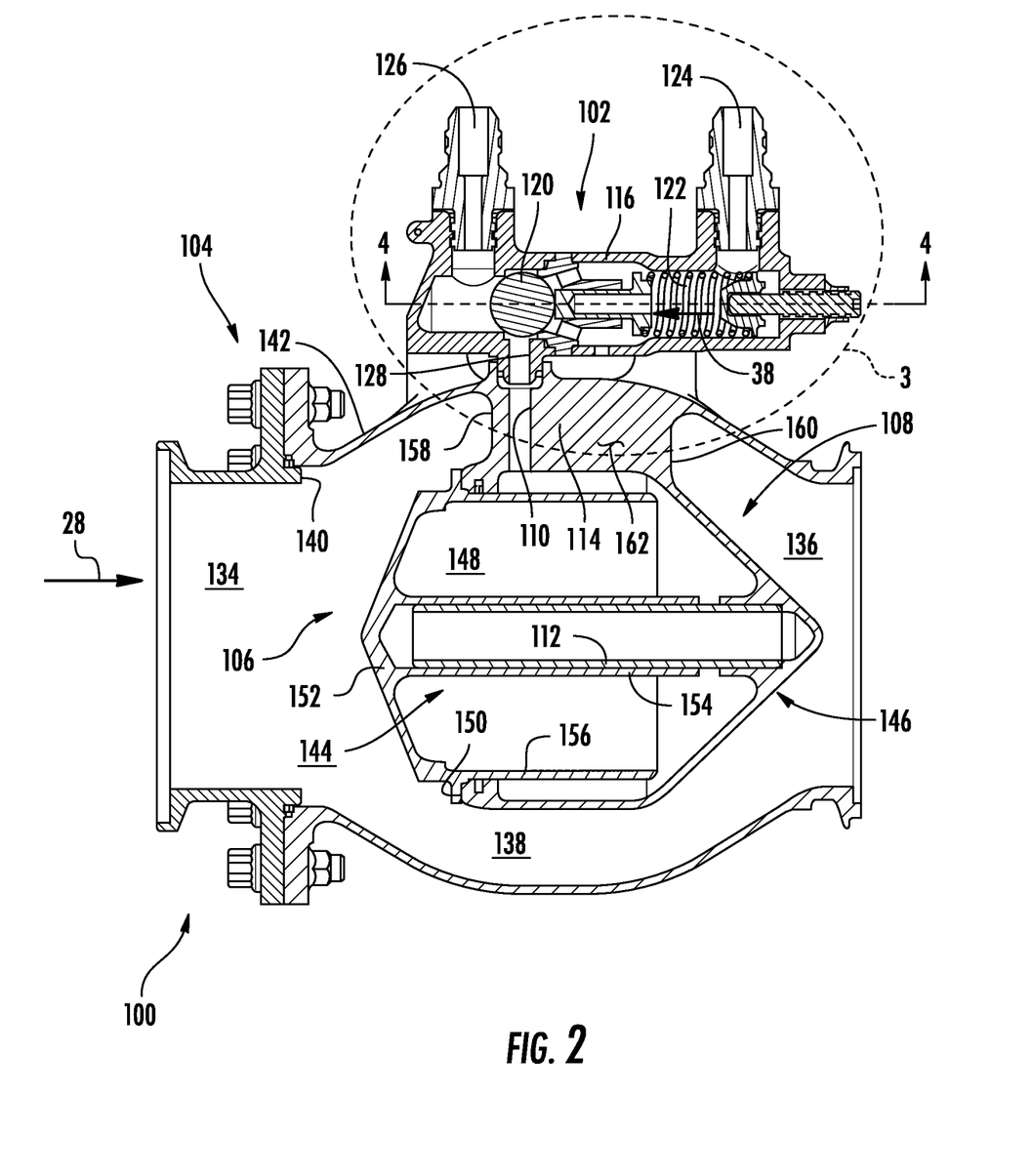
FIG. 2 is cross-sectional view of the inline valve of FIG. 1, showing a valve body with a poppet and an externally mounted controller for remotely communicating either a pressure of reference fluid or pressure of control fluid to the poppet.

With reference to FIG. 2, the inline valve 100 is shown. The inline valve 100 includes a pneumatic controller 102, valve body 104, and a poppet 106. The inline valve 100 also includes an actuator 108, a pneumatic conduit 110, a guide 112, and a fairing 114.

The pneumatic controller 102 generally includes a manifold 116 with a set screw 118 seated within the manifold 116, a selector 120, and a biasing member 122. The manifold 116 has a low pressure port 124, a high pressure port 126, and an actuator port 128. The selector 120 is movable within the manifold 116 between a first position 130 (shown in FIG. 5) and a second position 132 (shown in FIG. 6), the low pressure port 124 in fluid communication with the actuator port 128 in the first position 130, the high pressure port 126 in fluid communication with the actuator port 128 in the second position 132. The biasing member 122 urges the selector 120 towards the first position 130 with a biasing force and is supported for rotation R relative to the manifold 116 to limit eccentric force components, e.g., an eccentric force component E, of the biasing force exerted on the selector 120.

The valve body 104 has an inlet 134, an outlet 136, and an interior 138. The valve body 104 also has a valve body poppet seat 140 and a valve body exterior 142. The poppet 106, the actuator 108, the guide 112, and the fairing 114 are arranged within the interior 138 of the valve body 104. The pneumatic controller 102 is connected to the valve body exterior 142. The pneumatic conduit 110 fluidly connects the actuator 108 to the pneumatic controller 102, the pneumatic conduit 110 extending through the valve body exterior 142 and seating in the actuator port 128 of the pneumatic controller 102.

The actuator 108 has an open end 144, a closed end 146, and defines an actuator chamber 148 and actuator poppet seat 150. The closed end 146 of the actuator 108 opposes the outlet 136 of the valve body 104. The open end 144 of the actuator 108 opposes the inlet 134 of the valve body 104. The actuator poppet seat 150 extends about the open end 144 of the actuator 108. The guide 112 is fixed to the actuator 108 and is arranged within the actuator chamber 148. The poppet 106 is slidably received within the actuator 108 and on the guide 112, the poppet 106 and the actuator 108 thereby bounding the actuator chamber 148. The pneumatic conduit 110 is fixed to the actuator 108 and provides fluid communication between the pneumatic controller 102 and the actuator chamber 148.

The poppet 106 has a face portion 152, a guide portion 154, and a skirt portion 156. The face portion 152 opposes the inlet 134 of the valve body 104. The guide portion 154 of the poppet 106 extends from the face portion 152, towards the outlet 136 of the valve body 104, and is slidably received on the guide 112. The skirt portion 156 of the poppet 106 extends from the face portion 152 of the poppet 106 at a location radially outward of the guide portion 154 of the poppet 106, extends towards the outlet 136 of the valve body 104, and is slidably received within the actuator 108.

The fairing 114 extends about the pneumatic conduit 110 and couples the actuator 108 to the valve body 104. In this respect the fairing 114 has a leading edge 158, a trailing edge 160, and a fairing body 162. The leading edge 158 of the fairing 114 opposes the inlet 134 of the valve body 104 and extends between an interior surface 164 of the valve body 104 and the actuator 108. The trailing edge 160 of the fairing 114 extends between the interior surface 164 of the valve body 104 and the actuator 108 at a location downstream of the leading edge 158 of the fairing 114, and opposes the outlet 136 of the valve body 104. The fairing body 162 extends between the leading edge 158 and the trailing edge 160 of the fairing 114.

Figure 3:
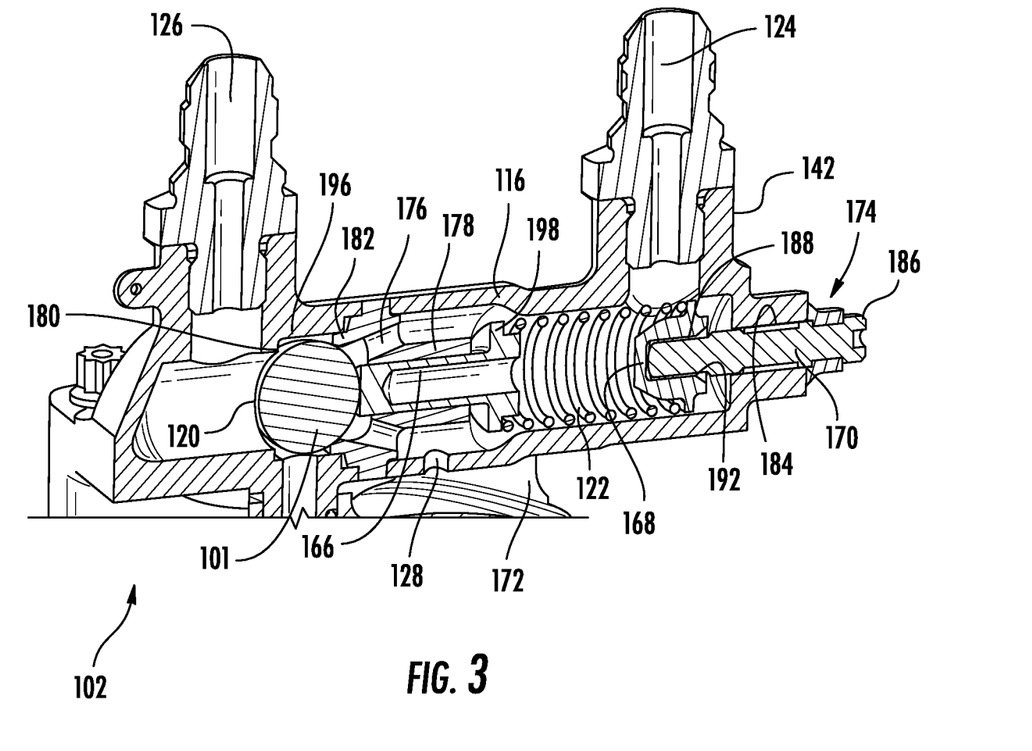
FIG. 3 is a cross-sectional perspective view of a portion of the inline valve of FIG. 1 including the pneumatic controller, showing a biasing member supported within the pneumatic controller and indirectly coupled to the selector for limiting eccentric loading of the selector.

With reference to FIG. 3, the pneumatic controller 102 is shown. The pneumatic controller 102 includes the manifold 116, the selector 120, and a plunger 166. The pneumatic controller also includes the biasing member 122, a biasing member seat 168, and a bias-set screw 170.

The manifold 116 has a mount portion 172, a bias-set screw port 174, and a manifold exterior 190, and defines within its interior a fluid channel 176. The mount portion 172 connects the manifold 116 to the valve body 104 and extends between the manifold 116 the valve body exterior 142, the pneumatic controller 102 and the valve body 104 thereby forming a unitary assembly or end item. The fluid channel 176 connects the bias-set screw port 174 with the low pressure port 124, the high pressure port 126, and the actuator port 128 124. A plunger guide 178 is fixed between the selector 120 and the low pressure port 124.

A first selector seat 180 and a second selector seat 182 are arranged within the fluid channel 176. More specifically, the first selector seat 180 is arranged within the fluid channel 176 between high pressure port 126 and the actuator port 128. The second selector seat 182 is arranged within the fluid channel 176 between the first selector seat 180 and an ambient vent 128 to the external environment 26 (shown in FIG. 1). The selector 120, the plunger 166, the biasing member 122, and the biasing member seat 168 are each disposed within the fluid channel 176. In this respect the selector 120 is disposed between the first selector seat 180 and the second selector seat 182. The plunger 166 is disposed between the selector 120 and the biasing member 122.

The biasing member 122 is disposed between the bias-set screw 170 and the selector 120. More specifically, the biasing member 122 is coupled to the selector 120 by the plunger 166, and is further coupled to the bias-set screw 170 by the biasing seat member 168. In this respect the biasing member 122 is spaced apart from the selector 120, e.g., is not in intimate mechanical contact with the selector 120. It is contemplated that the biasing member 122 can include a spring and/or a flexure, as suitable for an intended application.

The bias-set screw 170 has a threaded segment 184, a tool engagement feature 186, and a smooth segment 188. The threaded segment 184 is threadedly disposed within the biasing member seat 168. The tool engagement feature 186 is adjacent to the threaded segment 184, e.g., on a side of the threaded segment 184 opposite the biasing member seat 168, and is disposed on the manifold exterior 190. The smooth segment 188 is adjacent to the threaded segment 184, e.g., on a side of the threaded segment 184 opposite the tool engagement feature 186 and within the fluid channel 176, and is rotatably received within the biasing member seat 168.

The biasing member seat 168 is supported within the manifold 116 between the biasing member 122 and the bias-set screw port 174, defines a set screw socket 192, and has a seat member flange portion 194. The set screw socket 192 is defined on a side of the biasing member seat 168 opposite the biasing member 122 and the bias-set screw 170 is slidably received within the set screw socket 192. More specifically, the smooth segment 188 of the bias-set screw 170 is slidably received within the set screw socket 192 for rotation relative to the biasing member seat 168. The seat member flange portion 194 extends about the biasing member seat 168 and biasing member 122, e.g., an end of the biasing member 122 opposite the plunger 166, is seated of the seat member flange portion 194.

The plunger 166 has a push rod portion 167, is supported within the manifold 116, and couples the biasing member 122 to the selector 120. More specifically, the push rod portion 167 of the plunger 166 is slidably received within the plunger guide 178, overlaps a vent 129 to external environment 26 (shown in FIG. 1) along its length, and has a selector face 196 and a plunger flange portion 198. The plunger flange portion 198 extends circumferentially about the plunger 166 and the biasing member 122, e.g., at an end of the biasing member 122 opposite the biasing member seat 168, and is seated on the plunger flange portion 198. The selector face 196 opposes the selector 120 and is tangent to the selector 120. In certain embodiments the plunger 166 is slidably disposed within the second selector seat 182, which limits the positional error of the plunger 166 were the plunger guide 178 and the second selector seat 178 formed by separate structures or with separate apertures. As will be appreciated by those of skill in the art in view of the present disclosure, slidably disposing the plunger 166 within the second selector seat 178 limits eccentric loading of the selector 120 relative to the second selector seat 178 during movement between the first selector seat 176 and the second selector seat 178.

As illustrated and described herein the selector 120 has a spherical shape. In certain embodiments the selector 120 can include a ceramic material 101. In certain embodiments the ceramic material 101 is disposed as a coating disposed the selector 120, limiting wear of both the selector 120 and interior structures within the manifold 116. In accordance with certain embodiments the selector 120 can be formed entirely of the ceramic material 101, limiting wear and reducing weight of the pneumatic controller 102.

The biasing member 122 is compressively supported between the selector 120 and the bias-set screw 170. In this respect the biasing member 122 urges the selector 120 towards the first selector seat 180 with the biasing force 38 (shown in FIG. 2). The biasing force 38 in turn has a magnitude that depends, at least in part, upon the advancement (or retraction) of the bias-set screw 170 within the bias-set screw port 174. For example, advancing the bias-set screw 170 within the bias-set screw port 174 increases magnitude of the biasing force 36. Increase of the biasing force 36 in turn increases the pressure differential required across the high pressure port 126 and the low pressure port 124 required to move the selector 120 from the first position 130 (shown in FIG. 4) to the second position 132 (shown in FIG. 5). Oppositely, retracting the bias-set screw 170 from the bias-set screw port 174 reduces the magnitude of the biasing force 36 and reduces the pressure differential required across the high pressure port 126 and the low pressure port 124 required to move the selector 120 from the first position 130 to the second position 132. As the tool engagement feature 186 is located outside of the pneumatic controller 102 and the valve body 104, the pressure differential can be adjusted with the inline valve in-situ, e.g., while installed in the gas turbine engine 10 (shown in FIG. 1), simplifying installation and service of the inline valve 100 and the gas turbine engine 10.

As will be appreciated by those of skill in the art in view of the present disclosure, either (or both) the selector 120 and the biasing member 122 can be prone to eccentric loading when in intimate mechanical contact with one another. Eccentric loading can cause instability in the seating of (or both) relative to the other. Instability in seating can in turn cause influence performance of the pneumatic controller 102. To limit eccentric loading the pneumatic controller 1020 is arranged such that the biasing force 38 (shown in FIG. 2) exerted by the biasing member remains aligned to the selector 120 along a biasing axis 103 (shown in FIG. 4) to reduce the risk that either (or both) the selector 120 and the biasing member 122 being eccentrically loaded.

Figure 4:
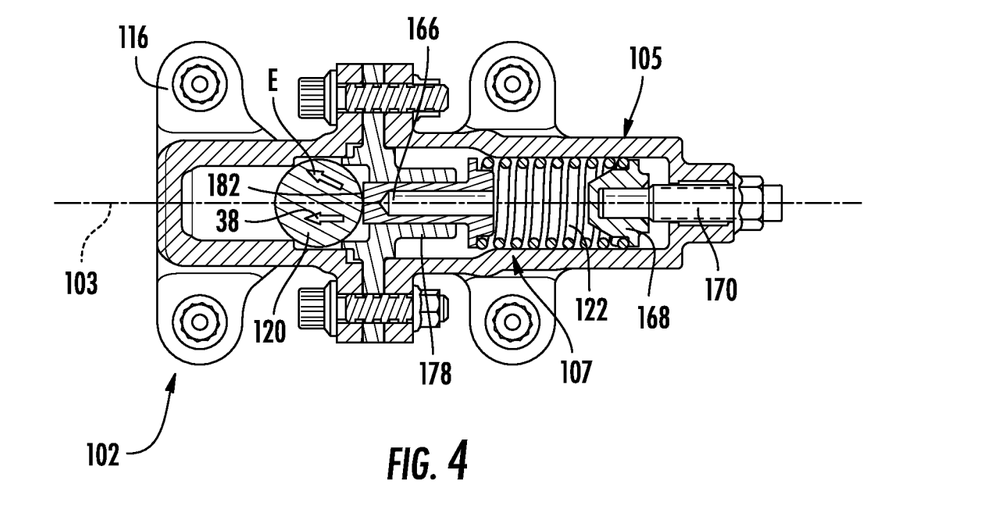
FIG. 4 is a cross-sectional plan view of the pneumatic controller of the inline valve of FIG. 1, showing the biasing member aligned along a bias axis with the selector and supported within the pneumatic controller by a spring seat and a plunger.

With reference to FIG. 4, communication of the biasing force 38 along the biasing axis 103 is shown. Air pressure at the high pressure port 126 exerts a high pressure force 46 on the selector 120. The bias-set screw 170 is threadably fixed relative to the manifold 116. The biasing member seat 168 abuts the bias-set screw 170 and is axially fixed along the biasing axis 103 relative to the bias-set screw 170. A set-screw end 105 of the biasing member 122 is fixed to the biasing member seat 168, and is axially fixed thereto. The plunger 166 is fixed to a plunger end 107 of the biasing member 122, and is axially fixed thereto. The plunger 166 extends from the plunger end 107 of the biasing member 122 through the plunger guide 178, is axially free and radially fixed therein relative to the biasing axis 103, and contacts the selector at the selector face 196. The selector face 196 is in turn tangent to the selector 120, the selector face 196 thereby communicating a force component of the biasing force 38 (shown in FIG. 2) that is parallel to (or coaxial) with the biasing axis 103. Notably, the selector face has an area with a width that is one-third or greater than a diameter of the selector 120, the plunger communicating the biasing force 38 on axis and within an eccentric force component during movement of the selector between the first selector thereby accommodating movement of the selector 120 between first selector seat 180 and the second selector seat 182. This allows the biasing member seat 168 and the plunger 166 to determine orientation of the biasing member 122, minimizing (or eliminating entirely) an eccentric loading E otherwise communicated to the selector 120, allowing the selector to seat against the first selector seat 180 and the second selector seat 182 with substantially no leakage.

Figure 5:
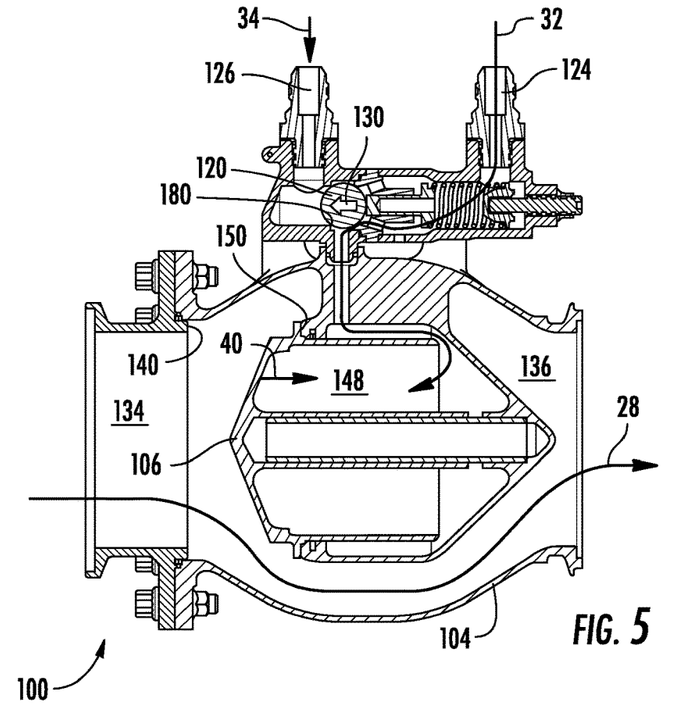
FIG. 5 is a cross-sectional view of the inline valve of FIG. 1, showing the selector in a first position and controller thereby communicating a flow of low pressure fluid to the poppet while cooling the biasing member with low pressure fluid.

With reference to FIG. 5, the inline valve 100 is shown with the selector 120 in the first position 130. The selector 120 moves to the first position 130 when the sum of the biasing force 38 (shown in FIG. 2) and force exerted on the selector 120 by the flow of low pressure fluid 32 exceeds the force exerted on the selector 120 by the flow of high pressure fluid 34. When this condition exists the selector 120 moves to the first position 130, wherein the selector 120 abuts the first selector seat 180. Abutment of the selector 120 with the first selector seat 180 places the low pressure port 124 in fluid communication with the actuator chamber 148. Fluid communication between the low pressure port 124 and the actuator chamber 148 in turn pressurizes the actuator chamber 148 according to the pressure of the flow of low pressure fluid 32.

When pressure of the working fluid flow 28 reaches pressure sufficient to overcome pressure of the flow of low pressure fluid 32 within the actuator chamber 148, the inline valve 100 passively opens 40, i.e., the poppet 106 moves from the valve body poppet seat 140 to the actuator poppet seat 150. Once the poppet 106 is against the actuator poppet seat 150 the inlet 134 of the valve body 104 is in fluid communication with the outlet 136 of the valve body 104, the compressor 12 (shown in FIG. 1) thereby being in fluid communication with the external environment 26 through the valve body 104. The compressor 12 is thereby able to increase pressure of the working fluid flow 28 without having to fully pressurize the working fluid flow 28 due to the venting provided through the inline valve 100 to the external environment 26, reducing the input energy required to start the gas turbine engine 10 (shown in FIG. 1).

Figure 6:
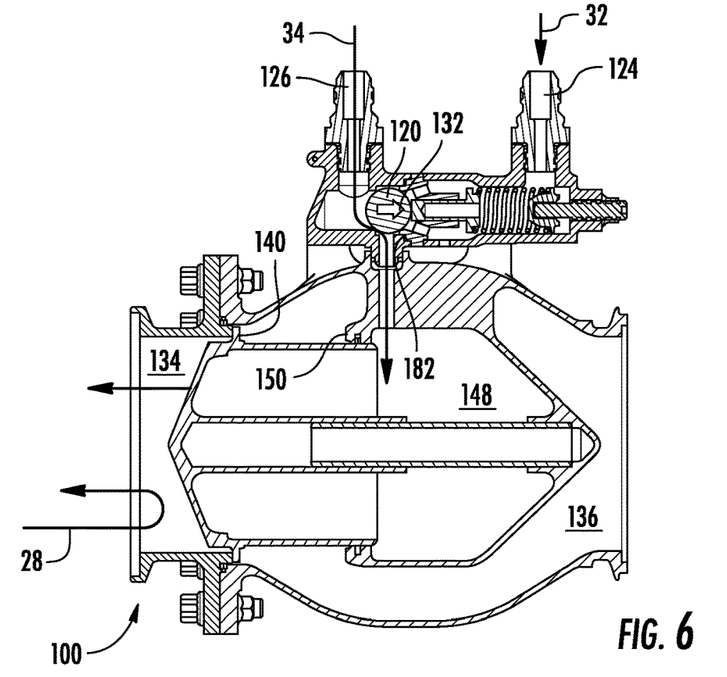
FIG. 6 is a cross-sectional view of the inline valve of FIG. 1, showing the selector in a second position and the pneumatic controller thereby communicating a flow of high pressure fluid to the poppet while cooling the biasing member with low pressure fluid.

With reference to FIG. 6, the inline valve 100 is shown with the selector 120 in the second position 132. The selector 120 moves to the second position 132 when the sum of the biasing force 38 (shown in FIG. 2) and force exerted on the selector 120 by the flow of low pressure fluid 32 falls below the force exerted on the selector 120 by the flow of high pressure fluid 34. When this condition exists the selector 120 moves to the second position 132, wherein the selector 120 abuts the second selector seat 182. Abutment of the selector 120 with the second selector seat 182 places the high pressure port 126 in fluid communication with the actuator chamber 148. Fluid communication between the high pressure port 126 and the actuator chamber 148 in turn pressurizes the actuator chamber 148 according to the pressure of the flow of high pressure fluid 34. Notably, the flow of low pressure fluid 32 received at the low pressure port 124 traverses the biasing member 122, insulating (and/or cooling) the biasing member 122, and thereafter issues from the pneumatic controller 102 through the vent 129 while the selector is in the second position 132.

When pressure of the flow of high pressure fluid 34 reaches pressure sufficient to overcome force exerted on the poppet 106 by the working fluid flow 28, the inline valve 100 passively closes 42, i.e., the poppet 106 moves from the actuator poppet seat 150 and against the valve body poppet seat 140. Once against the valve body poppet seat 140 the poppet 106 fluidly separates the outlet 136 of the valve body 104 from the inlet 134 of the valve body 104. This ceases fluid communication between the compressor 12 (shown in FIG. 1) and the external environment 26 through the inline valve 100.

Inline valves can be operated by selectively applying muscle pressure for actuation of the inline valve using pneumatic controllers. In controllers employing springs the air being controlled can be above the temperature at which the mechanical properties of the material forming the spring changes, potentially causing the spring performance to change and/or causing premature failure of the spring.

A pneumatic valve is often operated by a pneumatic controller, which controls muscle pressure to actuate the valve. That controller contains a spring and a ball prone to eccentric loading, which can cause instability in their seating and overall controller malfunction. A need exists for a method by which a spring and ball can be used in a controller in a manner by which the loading is aligned with the controller centerline as possible to reduce the risk of either part being eccentrically loaded.

This is a spring seat in a controller which acts in conjunction with a ball seat in the same controller. The controller must determine, without electrical input, the proper pressure to feed to the valve it is connected to. In the case of this controller, the ball can feed one of two inlet pressures to the valve, depending on the position of the ball. The spring and ball typically would interface directly with one another in the case of a relief valve. This is prone to several problems, such as the spring creating eccentric loading as an axial force is applied, which then will cause the ball to lose stability with its seat. As described herein the biasing force is guided to a mating surface of the plunger.

By having the ball seat and spring seat determine the orientation of the spring, the eccentric loading it will impart onto the ball is minimized, allowing the ball to more properly seat on its ball seat, thereby reducing leakage. As leakage is a critical measure of success for a controller, this invention improves on the overall performance of the controller.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An inline valve comprising:
   a valve that includes a valve body, the valve body having an exterior, an inlet, and an outlet; and
   a pneumatic controller, comprising:
   a manifold with a set screw seated therein and having a low pressure port, a high pressure port, and an actuator port, the manifold including a first selector seat fixed between the high pressure port and the actuator port, and a second selector seat fixed between the first selector seat and the vent, wherein the selector is disposed between the first selector seat and the second selector seat;

a selector movable within the manifold between a first position and a second position, the low pressure port in fluid communication with the actuator port in the first position, the high pressure port in fluid communication with the actuator port in the second position;

a biasing member urging the selector towards the first position with a biasing force, wherein the biasing member is spaced apart from the selector within the manifold by a piston to limit eccentric force exerted on the selector, wherein the mount portion of the manifold connects the manifold to the exterior of the valve body; and wherein the piston slideably passes through and is guided by the second selector seat.

2. The inline valve of claim 1, wherein the selector has a spherical shape.

3. The inline valve of claim 1, herein the selector comprises a ceramic material.

4. The inline valve of claim 1, wherein the piston is arranged between the biasing member and the selector.

5. The inline valve of claim 4, wherein the piston comprises a push rod portion with a selector face, the selector face tangent to the selector.

6. The inline valve of claim 4, wherein the piston a flange portion extending thereabout on an end of the piston opposite the selector, wherein the biasing member is fixed to the flange portion of the piston.

7. The inline valve of claim 4, wherein the manifold has a piston guide fixed between the high pressure port and the selector, wherein the piston is slidably disposed in the piston guide, wherein the selector abuts the piston guide in the second position.

8. The inline valve of claim 1, further comprising a biasing member seat supported within the manifold between the set screw and the biasing member.

9. The inline valve of claim 8, wherein the biasing member seat has a set screw socket, wherein the set screw is rotatably received within the set screw socket.

10. The inline valve of claim 8, wherein in the biasing member seat has a flange portion extending thereabout, wherein the biasing member is fixed to the flange portion of the biasing member seat.

11. The inline valve of claim 4, further comprising:
a pneumatic conduit fixed to the actuator port;
wherein the valve body has an exterior and an actuator chamber, the actuator chamber connected to the pneumatic conduit, wherein the manifold is fixed to the exterior of the valve body to provide low pressure fluid or high pressure fluid to the actuator chamber according to position of the selector.

12. The inline valve of claim 1, wherein the manifold has a mount portion, and further comprising a valve body with an exterior, the mount portion connecting the manifold to the valve body.

13. The inline valve of claim 1, wherein the manifold has a mount portion, wherein the vent and the mount portion are on a common side of the manifold.

14. The inline valve of claim 1,
wherein the manifold has a mount portion;
wherein the mount portion of the manifold connects the manifold to the exterior of the valve body; and further comprising:
a poppet supported within the valve body and operably associated with the selector, wherein the poppet is movable between an actuator poppet seat and valve body poppet seat within the valve body, the inlet of the valve body in fluid communication with the outlet of the valve body when the poppet is against the actuator poppet seat, the poppet fluidly separating the inlet from the outlet when the poppet is against the valve body poppet seat.

15. The inline valve of claim 14, wherein the selector has a spherical shape, and wherein the selector comprises a ceramic material.

16. As gas turbine engine, comprising:
a compressor having a bleed port, a high pressure stage downstream of the bleed port, and a low pressure stage upstream of the bleed port;
an inline valve as recited in claim 1,
wherein the high pressure stage is connected to the high pressure port; and
wherein the inlet is in fluid communication with the bleed port of the compressor, wherein the pneumatic controller is mounted to an exterior of the valve body.

17. The gas turbine engine of claim 16, wherein the compressor has a low pressure stage upstream of the bleed port, and wherein the low pressure stage is connected to the low pressure port, or wherein the low pressure port is in fluid communication with the external environment to communicate ambient pressure therethrough.

* * * * *